United States Patent [19]

Kletecka et al.

[11] Patent Number: 5,098,944

[45] Date of Patent: Mar. 24, 1992

[54] THERMOOXIDATIVE STABILIZATION OF POLYMERS WITH A N4-ALKYLATED OXO-PIPERAZINYL-TRIAZINE

[75] Inventors: George Kletecka, Fairview Park; John T. Lai, Broadview Heights; Pyong N. Son, Akron, all of Ohio

[73] Assignee: The B.F. Goodrich Company, Akron, Ohio

[21] Appl. No.: 580,727

[22] Filed: Sep. 11, 1990

[51] Int. Cl.$^5$ .............................. C08K 5/3492
[52] U.S. Cl. .................................... 524/100
[58] Field of Search ..................... 544/113; 524/100

[56] References Cited

U.S. PATENT DOCUMENTS

| | | | |
|---|---|---|---|
| 4,190,571 | 2/1980 | Lai | 524/100 |
| 4,480,092 | 10/1984 | Lai et al. | 544/113 |
| 4,629,752 | 12/1986 | Layer et al. | 524/100 |
| 4,639,479 | 1/1987 | Lai et al. | 524/100 |
| 4,780,495 | 10/1988 | Lai et al. | 524/100 |
| 4,816,507 | 3/1989 | Cantatore | 524/100 |

FOREIGN PATENT DOCUMENTS 2194237A 3/1988 United Kingdom .

*Primary Examiner*—Kriellion S. Morgan
*Attorney, Agent, or Firm*—Alfred D. Lobo

[57] ABSTRACT

An oxo-piperazinyl triazine with three piperazinone substituents, each of which has an alkylated $N^4$ atom ("MPIP-T"), used in an amount no more than 0.2 phr, and without any secondary stabilizer (hence referred to as a "virgin MPIP-T"), and in particular, without any hindered phenol antioxidant, or phosphorous acid ester, simultaneously provides thermooxidative stability and stability against degradation by UV light along with acceptable melt processability. Further, the virgin MPIP-T allows (i) uninterrupted operation of a die or mold while maintaining the surfaces of the cavities essentially contaminant-free; and, (ii) excellent AO stabilization which is equivalent to that obtained with a premier hindered phenol AO, and superior to that obtained with the premier oligomeric piperidinyl-triazine compound, when each stabilizer is used in the same amounts by weight in a thermoplastic synthetic resinous substrate.

10 Claims, No Drawings

THERMOOXIDATIVE STABILIZATION OF POLYMERS WITH A N4-ALKYLATED OXO-PIPERAZINYL-TRIAZINE

BACKGROUND OF THE INVENTION

Antioxidants ("AO"s) are used to protect hydrocarbon polymers against thermal oxidative ("thermooxidative") degradation caused by reaction with atmospheric oxygen, usually at, or above ambient temperature. Oxidation causes undesirable changes in mechanical, aesthetic, and electrical properties of the polymer. Some polymers degrade more readily than others, depending upon their structure. The high order of effectiveness of several tetramethylpiperidinyl-benzoate derivatives in inhibiting the thermal oxidation of lauryl aldehyde was measured and the data reported in an article titled "Stabilization Mechanisms of Hindered Amines" by Peter M. Klemchuk and Matthew E. Gande in *Makromol. Chem., Makromol. Symp.* 28, 117–144 (May 1989). The rate of oxygen uptake with no stabilizer was 3.6 mmol/hr; with BHT was 1.9 mmol/hr; and with tetramethylpiperidin-1-oxyl was 0.08 mmol/hr. The rate of oxygen uptake was comparably low (that is <0.1 mmol/hr) for tetramethylpiperidinyl compounds with >N-H; >N-OH; and >N—O° groups in the tetramethylpiperidinyl moiety, indicating that stabilizers containing a tetramethylpiperidinyl moiety and known to be good light stabilizers, have good thermooxidative properties.

Despite the piperidinyl derivatives being generally regarded as ultraviolet light stabilizers, such known, good thermooxidative stabilization obtained with the piperidinyl derivatives, led to the statement: "In recent years, interest in the use of antioxidants to give protection against the effects of light has considerably increased. There are a number of reasons for this, but the main ones appear to be advances in the understanding of mechanisms of photo transformations of polymers of different kinds, which demonstrate the key role of free radicals and photochemically active molecular intermediate products with which antioxidants are likely to interact. From the practical viewpoint a significant incentive proved to be the development of new high-efficiency light stabilizers, especially the sterically hindered amines, which act predominantly as antioxidants. Interest in the use of antioxidants for light stabilization is also associated with the fact that they happen, at the present time, to be the principal class of thermostabilizers of polymers. Consequently, their choice makes it possible to achieve complex protection of the polymeric material. See "Stabilization of Polymers Against the Effect of Light by Means of Antioxidants" by V.B. Ivanov and V. Ya. Shlyapintokh *Polymer Deoradation and Stability* 28 (1990) 249–273.

The foregoing statement, despite the fact that hindered amines are usually classified as light stabilizers rather than AOs (since they are extremely effective in protecting polyolefins and other polymeric materials against photodegradation) underlines the intense search in the marketplace for a hindered amine which is both an AO and a UV stabilizer.

Though the piperidyl compounds are stated to be effective antioxidants, they are not effective enough (as an antioxidant) in polyolefins, and in particular, homopolymers of propylene, or copolymers of propylene and ethylene in which the latter is present in a minor amount by weight (such homopolymers and copolymers are collectively referred to herein as "PP" for brevity), to warrant their use, without the use of a secondary stabilizer, for such duty. When piperidinyls are used as stabilizers, they are used as light stabilizers to protect against ultraviolet radiation, and, in practical applications, only in combination with a phosphorous acid ester, hindered phenol or other antioxidant.

The foregoing is equally true for piperazin-2-one-containing compounds used as hindered amine light stabilizers ("HALS" for brevity). Evidence of the foregoing is provided in an article titled "Hindered Diazacycloalkanones as Ultraviolet Stabilizers and Antioxidants" by J.T. Lai, P.N. Son and E. Jennings, *Polymer Stabilization and Degradation* 91–99, ACS Symposium Series, American Chemical Society, Washington, D.C. (1985). Slit tapes of PP (2 × 100 mil) containing a combination of 0.1 phr (parts per 100 parts of substrate) of HALS, aged in the Arizona sun, even the polymeric piperidine did not fare very well (pg 92).

Unique among the HALS disclosed in the aforesaid article was a decahydroquinoxaline which provided both AO and light stabilization. It was determined that the most important features for its AO activity were (i) the fused bicyclodiazacycloalkane ring, (ii) dialkyl substituents at the $C^3$ position, and (iii) alkyl, instead of acyl substituents at the $N^1$ position.

We have now provided a monomeric $N^4$-methylated oxopiperazinyl triazine (MPIP-T) which, by itself, gives protection against thermooxidative degradation when essentially homogeneously distributed in a wide array of synthetic resinous materials. In addition, it is an excellent stabilizer against degradation by UV light, and provides adequate stability during melt processing. No known HALS stabilizer provides this combination of properties.

The conventional view of the HALS in general, and the polysubstituted piperazinone-containing ("PSP") HALS in particular, was that such contribution to thermooxidative stabilization as they made in combination with a hindered phenol AO or other secondary stabilizer, was eschewed in favor of leaving out the AO for the specific purpose of obtaining better gas fade stabilization and stabilization against gamma-radiation. U.S. Pat. No. 4,797,438 patent teaches the gamma-stabilizing activity of PSP-containing HALS in the absence of an antioxidant; and U.S. Pat. No. 4,929,653 teaches the ability of PSP-containing HALS to improve gas fade resistance in the absence of an antioxidant.

A recent article titled "New Developments in Polymer Stabilization" by Motonobu Minagawa *Polymer Degradation and Stability* 25 (1989) 121–141 provides an up-to-date appraisal of the field as viewed by one skilled in the art. At the outset it points out that, since chemical reactions of stabilizers contribute to stabilization, these reactions proceed in the molten highly viscous state or in the amorphous solid phase. Additives should, therefore, possess adequate mobility to react in plastics. This is probably the reason why the molecular weights (MW) of commercial stabilizers are almost always in the range of 200–2000, although there are some exceptions. But to prevent loss of stabilizer from the polymer in increasingly severe conditions of application, the tendency is to increase MW.

Among the low MW HALS in the range from about 400–1000 are Tinuvin 144 (Ciba-Geigy), Sanol LS 2626 (Sankyo), Mark LA-57, Mark LA-52 and Mark LA-62 (Adeka Argus), and Sumisorb TM-061 (Sumitomo Chem). But such low MW HALS result in loss or decomposition during the period from processing to end use. For the high retention which is necessary, high MW HALS are used.

Among the high MW HALS in the range above about 2000 are Tinuvin 622 LD, Chimassorb 119 and Chimassorb 944 (Ciba-Geigy); Mark LA-63 and Mark LA-68 (Adeka Argus); Spinuvex A-36 (Montedison) and Cyasorb UV-3346 (American Cyanamid).

But all HALS tend to form salts with acids and the salts adversely affect weather resistance, hence greatly reduce the performance of the stabilizer. Moreover, the salts contribute to contamination of the surfaces of molds or dies used to mold or extrude, or otherwise thermoform, the articles to be stabilized. Such problems associated with the alkalinity of the piperidinyl-containing HALS have been substantially negated by the use of a HALS with one or more piperazin-2-one moieties. Especially desirable stability is obtained with piperidyl moieties connected to a triazine ring, such as Chimassorb 944 and Chimassorb 119 commercially available from Ciba-Geigy. Comparable or better stability is obtained with piperazin-2-one moieties distally connected to a triazine ring in the stabilizers disclosed in U.S. Pat. Nos. 4,480,092 to Lai et al., and 4,629,752 to Layer et al, both in class 544/subclass 113.

We have now provided a method for molding or extruding articles melt, and thermooxidatively stabilized with only a low MW HALS, specifically a MPIP-T, while maintaining the surfaces of the mold or die essentially free of contaminants during operation.

As stated hereinabove, HALS protect polymers by functioning as light-stable antioxidants. Their antioxidant activity is explained by a reaction sequence in which hindered amines terminate propagating reactions by trapping both alkyl and peroxy radicals. But oligomeric HALS are highly effective against oxidation when exposed at 120° C. in a forced-air oven. (see "Antioxidants" Vol 2, Encyclopedia of Polymer Science and Engineering, 2d edition, John Wiley & Sons). A piperazinone-containing HALS which we use, by itself without a secondary stabilizer (hence referred to as a "virgin MPIP-T"), has unsubstituted $N^4$ atoms, is not oligomeric and has a MW < 1000. Yet the MPIP-T has a very low rate of migration. The rate of migration is so slow that the stabilizer does not cause significant contamination of a mold—a problem which must be addressed when the stabilizer is combined with a hindered phenol. Neither is the stabilizer readily extractable with ethanol in which the stabilizer is typically soluble. Such low extractability makes the MPIP-T stabilizer acceptable for use in containers for comestible foods. This MPIP-T is also relatively non-toxic having a toxicity far less than that of the commercially used hindered phenols, and comparable to that of a piperidnyl-triazine containing HALS.

Compounds referred to as oxo-piperazinyl triazines in this specification are those which contain a triazine ring with three piperazinone substituents, each of which has a alkyl-substituted $N^4$ atom, and each of which is substituted with two substitutents, or, substituted with a spiro substituent, (referred to as being "polysubstituted"), at both the 3 and 5 positions of the piperazinone ring. Compounds referred to as piperidinyls are those which contain at least one piperidinyl ring which is either disubstituted, or substituted with a spiro substituent at the 2 and/or 4 positions. When substituted as described, such compounds, whether piperazinones or piperidines, are referred to as being polysubstituted. Compounds referred to as MPIP-Ts are those which contain only a single triazine ring having a substituent at each C atom of the ring, each substituent containing a polysubstituted piperazinone ring.

A monomolecular virgin MPIP-T having a single triazine ring, has been found to be a better AO in polyolefins, particularly in PP, than an oligomeric stabilizer having a triazine ring connected to plural polysubstituted piperidyl moieties. The emphatic interest in using a virgin PIP-T is to avoid the complicating side-effects which attend the use of secondary stabilizers, and to lower cost.

The PSP moieties of the MPIP-T are connected to the triazine ring through an alkyleneamino chain. In prior art oxo-piperazinly triazines (PIP-Ts) disclosed in the '092 patent, the chain is unbranched; and in the '752 patent, the chain is branched. Details of the structures of the MPIP-T are set forth hereafter.

We have now found (as will be evident from the data set forth hereunder) that the virgin MPIP-T which we knew provided excellent stabilization against degradation by light (that is, had excellent u-v light stabilization properties), also functions as an excellent AO when used in a concentration no more than 0.2 phr, without any secondary stabilizer. As an AO, the virgin MPIP-T is a more effective AO than not only the conventional hindered phenols which dominate the market-place, but also more effective than the dominant HALS oligomeric stabilizer Chimassorb 944 which is a compound having a repeating unit consisting essentially of a triazine ring and two polysubstituted piperidine rings.

Because there is so small a concentration of virgin MPIP-T in a stabilized polyolefin the MPIP-T is far less prone to migration to the surface of the article, particularly during molding or extruding the polyolefin, thus minimizes the contaminant effect of the MPIP-T on the surfaces of the mold or die. Such a low concentration also makes it difficult to extract the MPIP-T with a solvent, thus permits using the MPIP-T in polyolefins for making containers for comestible foods, because such very small amount of MPIP-T as may be extracted into the food, renders de minimis the slight toxicity of the MPIP-T.

The unexpected properties of the virgin MPIP-T deriving from its use as an AO in synthetic resinous materials are attributable to the presence of the PSP moiety, and the fact it is distally connected to the triazine ring by an alkyleneamino chain. We have now found that this structure accounts for the easily distinguishable AO activity of a monomeric virgin MPIP-T compared with that of a piperidyl-triazine oligomer.

In addition to the surprising effectiveness of a MPIP-T when it is used as the only stabilizer in any synthetic resinous material, whether in fiber or any other shaped article, the MPIP-T is extremely persistent—that is, it does not degrade thermally. Nor is a MPIP-T volatilized during the manufacture of an article despite its essentially similar volatilization temperature compared with that of Chimassorb 944. Nor is the MPIP-T volatilized during the useful life of the article at relatively high temperature, which, if the article is made from PP, is a temperature in the range from about 120° C. to about 145° C., or below the heat distortion temperature (HDT) of the PP.

This resistance to migration at elevated temperature makes a MPIP-T the stabilizer of choice for impellers for washing machines for clothes, and impellers for dish-washing machines; as an inner liner for automobile fenders; for under the hood applications in automobiles; etc.

Further, a MPIP-T is exceptionally compatible with polymers, and in the low concentration used in this invention, behaves as a single phase, for example by being substantially soluble in many polymers, particularly PP, polyethylene (PE), and copolymers thereof, the solubility being affected by the molecular weight of the polymer. This is particularly note-worthy because polar UV stabilizers are known to be excluded from the crystalline phase of a polyolefin such as PP, preferring to be concentrated in the amorphous phase from which the stabilizer can more readily migrate to the surface of a mold or die in which an article is being formed.

Equally noteworthy is that most HALS with a substituent on the N atom, result in retarded nitroxide formation. This was studied in piperidyl amines and reported in an article titled "Photo-degradation and Photo-stabilization in Organic Coatings Containing a Hindered Amine Light Stabilizer: Part VI—ESR Measurements of Nitroxide Kinetics and Mechanism of Stabilization" by D.R. Bauer et al *Polymer Degradation and Stability* Vol 28, 115-129 (1990. Conversion was fastest for the >N—H group. Also fast is that for >N—CH$_3$, each of which is about an order of magnitude faster than the conversion for other substituents. This provides an insight into the AO activity of the virgin MPIP-T.

Moreover, preferred MPIP-Ts are essentially water-white, or only slightly colored, crystalline or amorphous solids, or non-viscous liquids, so that they are easily homogeneously dispersed in a polymeric substrate and impart no color, or only a negligible amount of color to the substrate in which they are dispersed or dissolved. Because of its bulky structure which is remarkably soluble as long as the concentration is no more than 0.2 phr, particularly in PP, once compatibilized in the substrate, a MPIP-T diffuses ever so slowly. In addition, its relatively lower pH compared with piperidinyltriazines, appears to negate the tendency of the MPIP-T to contaminate the surface of molds or dies under injection molding, blow molding, or other high temperature forming operations. This not only avoids marring the surface of the article formed, but avoids having to interrupt operation of the molding machine to clean the surfaces of the cavities in the mold frequently.

Perhaps, most important, the properties of a MPIP-T allows it to be used to stabilize housings for equipment,; fibers for fabrics for clothing, even articles worn next to the skin; receptacles such as garbage cans, and containers for foods and beverages for human consumption, because when used in the amount of no more than 0.2 phr in polyolefins, this MPIP-T is typically not objectionably toxic.

SUMMARY OF THE INVENTION

It has been discovered that an oxo-piperazinyl triazine with three piperazinone substituents, each of which has an alkylated N$^4$ atom ("MPIP-T"), used in an amount no more than 0.2 phr, and without any secondary stabilizer (hence referred to as a "virgin MPIP-T"), and in particular, without any hindered phenol antioxidant, or phosphorous acid ester, simultaneously provides thermooxidative stability and stability against degradation by UV light along with acceptable melt processability. Further, the virgin MPIP-T allows (i) uninterrupted operation of a die or mold while maintaining the surfaces of the cavities essentially contaminant-free; and, (ii) excellent AO stabilization which is equivalent to that obtained with a premier hindered phenol AO, and superior to that obtained with the premier oligomeric piperidinyl-triazine compound, when each stabilizer is used in the same amounts by weight in a thermoplastic synthetic resinous substrate.

It is therefore a general object of this invention to provide a process for thermoforming a synthetic resinous material to produce an article of arbitrary shape, comprising simultaneously maintaining the cavity surfaces of a forming die or mold essentially free from contaminants during operation continuously to mold articles, and, stabilizing the material being molded, such as a polyolefin, against thermooxidative degradation with a virgin MPIP-T in an amount in the range from about 0.1 phr to no more than 0.2 phr, which MPIP-T is compatible with the material being molded. The article is molded, extruded, or otherwise formed, with adequate melt processability, at a temperature in the range from about 160° C. to about 225° C., over a continuous operating period of at least 120 hr without objectionable contamination of the surfaces of the mold cavity.

It has also been discovered that no more than 0.2 phr of a MPIP-T, homogeneously dispersed within a PP substrate, is so low a concentration of MPIP-T as to hinder its extraction with ethanol at 49° C. (120° F.) for 240 hr, after an initial 2 hr soak at 65° C. (149° F.), yet is sufficient, simultaneously to stabilize the PP against thermooxidative degradation, not only during the molding operation, but thereafter, over the useful life of the PP article formed.

It has still further been discovered that a virgin MPIP-T present in no more than 0.2 phr concentration, allows stabilization of PP while it is being molded or otherwise thermoformed at a temperature in the aforesaid range, into a container for comestible food, without an objectionable amount of MPIP-T being extracted from the container into the food while the container is in storage.

It is therefore a general object of this invention to provide a thermoformed article of arbitrary shape, formed from a homopolymer of an o-olefin, or a copolymer of an α-olefin, in which copolymer a repeating unit derived from said α-olefin is present in a major molar amount, in which homo-polymer or copolymer is disperse no more than 0.2 phr of virgin MPIP-T.

It is a specific object of this invention to provide a PP container for comestible foods, the PP being stabilized against thermooxidative degradation by homogeneously dispersing within the PP the aforestated minimal amount of virgin MPIP-T, which is sufficient, simultaneously to essentially negate a toxic amount of MPIP-T to be extracted from the substrate while the container is stored, and, to stabilize the substrate against thermooxidative degradation.

DETAILED DESCRIPTION OF PREFERRED EMBODIMENTS

Synthetic resinous materials which may be unequally stabilized against thermooxidative degradation include polyolefins, whether homo- or copolymers, exemplified by polyethylene, polypropylene, propylene-ethylene copolymers, ethylene-propylene diene copolymers, ethylene-vinylacetate copolymers, and the like; homo- and copolymers of polyvinyl aromatics exemplified by polystyrene, acrylonitrile-buta-diene-styrene copolymers, styrene-acrylonitrile copolymers and the like; homo- and copolymers of polyvinyl halides exemplified by polyvinyl chloride, copolymers of vinyl chloride with vinylidene chloride, butadiene styrene, vinyl esters and the like; homo- and copolymers of acrylic acid, acrylates and methacrylates, exemplified by polyacrylic acid, polyacrylates or methacrylates, copolymers with butadiene and the like; condensation homo- and copolymers exemplified by polyamides, epoxy resins, polycarbonates, phenol-formaldehydes, polyesters, varnish, polyimides, and the like; addition polymers and copolymers exemplified by polyurethanes and the like; and, blends and alloys, exemplified by blends of ABS resins, PVC and polymethacrylate blends, blends of polyolefin homopolymers and copolymers such as blends of polypropylene in EPDM polymers, and the like.

The monomolecular polysubstituted N4-alkylated piper-azinone-triazine (MPIP-T) compound having a single triazine ring is represented by the structure

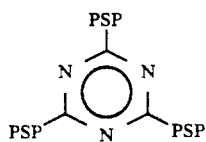

wherein PSP represents a substituent derived from a cyclic amine represented by a structure selected from the group consisting of

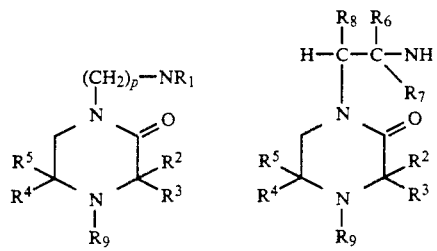

wherein
R$_1$ represents C$_1$-C$_{24}$ alkyl, C$_5$-C$_{20}$ cycloalkyl, C$_7$-C$_{20}$ araalkyl or alkaryl, C$_1$-C$_{24}$ aminoalkyl, or C$_6$-C$_{20}$ aminocycloalkyl;

R$_2$, R$_3$, R$_4$, and R$_5$ independently represent C$_1$-C$_{24}$ alkyl; and, R$_2$ with R$_3$, or R$_4$ with R$_5$ are cyclizable to C$_5$-C$_{12}$ cycloalkyl including the C$^3$ and C$^5$ atoms respectively, of the piperazin-2-one ring;

R$_6$ and R$_7$ independently represent C$_1$-C$_{24}$ alkyl, and polymethylene having from 4 to 7 carbon atoms which are cyclizable;

R$_8$ represents H, C$_1$-C$_6$ alkyl, and phenyl;

R$_9$ represents C$_1$-C$_3$ alkyl; and, p represents an integer in the range from 2 to about 10.

It is this limited class of MPIP-Ts, and particularly those monomolecular ones having a relatively low MW in the range from about 850 to less than 2000, which display the remarkable AO stabilization activity in the absence of any secondary stabilizer, along with relatively low toxicity, and only a slight proclivity to contaminate the surface of a cavity in a mold or die, all of which properties are conspicuously absent from N$^1$-alkylated piperidyl-triazine HALS.

The particular degree of effectiveness of the virgin MPIP-T as an AO in PP is evidenced by improved strength and discoloration resistance, and the retention of flexibility of test samples of PP plaques and fibers oven-aged by exposure to heat in a convection oven in accordance with the procedure for heat aging without load set forth in ASTM D-3045-74. The tensile strengths of plaques were measured according to the procedure set forth in ASTM D-882-83. Failure is determined either by intense discoloration, or brittleness when manually flexed, or when the tensile is reduced by 50% from the original.

Since the effectiveness of a HALS is predicated upon destruction of hydroperoxide, a piperidyl HALS being more basic would be expected to be more effective because it would tend to associate with the weakly acidic hydroperoxide forming predominantly in the amorphous phase (see "Antioxidant Mechanisms of Hindered Amine Light Stabilizers" by D, J. Carlsson, et al *Makromol. Chem. Suool.* Vol 8, 79-88 (1984) and more effectively destroy the hydroperoxide. That the AO additive will be largely concentrated in the amorphous zones of the polymer where mobility is most favored, is also stated in "Photo-oxidation of Polypropylene Films. VI. Possible UV-stabilization Mechanisms" by D. J. Carlsson et al in *Jour. of Appl. Polvm. Sci.* Vol 16, 615-626 (1972), middle of pg 616. What actually appears to happen is that, contrary to what one would expect, the less basic piperazinone HALS works more effectively. The lower basicity of the PIP-T permits this mechanistic quirk to redound to the thermooxidative stabilizing effect of the virgin PIP-T. The basicity of an oligomeric piperidinyl-triazine compound is nearly 40% greater than that of a PIP-T. The relative basicities are as follows:

a piperidyl-based HALS has a basicity of about pK$_a$ = 10.0 a piperazinone-based HALS has a basicity of about pK$_a$ = 6.2 where pK$_a$ = pH − log [>NH]/[>NH$_2$ +]

A particular MPIP-T has the structure (I) in which PSP is represented by

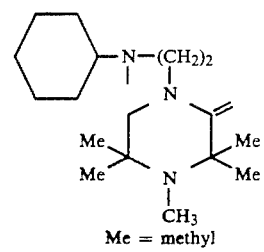

MPIP-T(1)

Me = methyl

The average results (failure at the end of days) obtained in the standard procedure of over aging at 125° C. with each stabilizer identified, using a statistically significant number of PP plaques, each plaque 5 cm × 5 cm × 20 mils thick, are set forth in Table 1 herebelow:

TABLE 1

| Identif. of stabil. | Level of stabilizer | 125° C. (days) | 40° C. (days) |
|---|---|---|---|
| Blank PP | 0 | 11 | 2 |
| MPIP-T(1) | 0.1 | >212* | 73 |
| Chimassorb 944 | 0.1 | 89 | 24 |
| Irganox 1010 | 0.1 | 137 | 59 |
| Irganox 1076 | 0.1 | 56 | 12 |
| Irganox 3114 | 0.1 | 65 | 10 |
| Ultranox 626 | 0.1 | 32 | 8 |
| Ethanox 398 | 0.1 | 25 | 6 |
| MPIP-T(1) | 0.2 | >212* | 80 |
| Chimassorb 944 | 0.2 | 150 | 37 |

TABLE 1-continued

| Identif. of stabil. | Level of stabilizer | 125° C. (days) | 40° C. (days) |
|---|---|---|---|
| Irganox 1010 | 0.2 | >212* | 108 |
| Irganox 1076 | 0.2 | 83 | 15 |
| Irganox 3114 | 0.2 | 139 | 19 |
| Ultranox 626 | 0.2 | 32 | 10 |
| Ethanox 398 | 0.2 | 20 | 14 |

*the samples have not yet failed - September 11, 1990.

Though the MPIP-T(1) does not provide as good stability as the hindered phenol Irganox 1010, the MPIP-T(1) is clearly superior to Chimassorb 944. At the 0.1 phr level at 140° C. the MPIP-T is three times better, and at the 0.2 phr level, the MPIP-T is more than two and one-half times as effective.

Migration Studies of MPIP-T in PP Discs

A statistically significant number of PP discs containing 0.6 phr of MPIP-T(1) and 0.05 phr calcium stearate were molded to about 2 mm thickness and 5 cm in diameter. The blank discs contained no MPIP-T(1). Extraction of MPIP-T(1) from the discs was done in 95% ethanol at 120° C. (49° C.) after initial 2 hr at 149° F. (65° C.) for 240 hr according to the procedure indicated in "Guidelines for Migration Studies for FDA Acceptance of Indirect Food Additives" by William C. Bachtel. Analysis was done by HPLC (high pressure liquid chromatography). About 50% of the final concentration of extracted material extracts in the first 2 hr. The quantity of extracted material after 240 hr is about 2% of the total MPIP-T(1) initially present.

A comparative weight loss study for the monomeric MPIP-T and the oligomeric piperidyl-triazine by thermogravimetric analysis in air (atmospheric purge of 180 cc/min) at 100/min showed that a weight loss of 0.1% was measured for the MPIP-T at 206° C.; the same weight loss of 0.1% for Chimassorb 944 was measured at 238° C. Despite the fact that the virgin MPIP-T experienced the weight loss at a lower temperature than the virgin Chimassorb 944, it proved to be a more effective AO.

Color Retention

Knitted polypropylene yarn formed from PP containing 0.2 phr virgin MPIP-T and coated with 1% Napcostat 905M finish was placed in a gas-fade chamber exposing the fibers to nitrogen oxides and then placed in an oven aging test with 3 cycles each 6 hr, the temperature being ±60C. The yellowness index remained below 10, and the whiteness index remained above 40, these being values at which the fiber is deemed to be essentially water white. The indices were measured in accordance to standard procedures.

For comparison, knitted yarn formed from polypropylene containing 0.2 phr virgin Chimassorb 944 is similarly coated and exposed to the same sequence of cycles in the gas-fade chamber and the oven. The yellowness index was 12 that is, above 10), and the whiteness index was 32 (that is, below 40). This comparison provides evidence that the virgin MPIP-T provides better retention of color than the virgin Chimassorb 944.

Comparative tests with Injection Molded Articles

A first batch of water-white polypropylene which is to be injection molded, is stabilized with 0.2 phr of virgin MPIP-T(1); a second batch of PP, also water-white, is stabilized with both 0.2 phr MPIP-T(1) and 0.2 phr Irganoz 1010. A single-cavity mold with a diamond-polished mold cavity, to mold a casette box with integral lid (weighing about 1 oz.) with a "live" hinge, is placed in an Arburg Model 220-90-350U injection molding machine. The machine is operated continuously for 120 hr with each PP batch of powder at identical molding conditions, and the surfaces of the cavity are examined, as are the surfaces of the casette boxes molded.

The surfaces of the cavity are much cleaner, and the surfaces of the molded casette boxes are smoother with the first batch of PP powder, than they are with the second batch. Further, the color of the boxes made from the first batch are better, that is, essentially water-white, while the boxes from the second batch have a slight tinge.

The conclusion is that there is a distinct advantage to using the virgin MPIP-T.

28-Day Repeated-Dose Oral Toxicity Test of MPIP-T in Rats

The remarkable lack of toxicity of the MPIP-T(1) is evidenced by the following test results of 28-day repeated-dose oral toxicity tests conducted with rats.

Groups of 5 male and 5 female Sprague-Dawley rats were dosed for 4 weeks with MPIP-T(1) at dose levels of 0, 100, and 1000 mg/kg/day via the diet. Additional groups of 5 males and 5 females were administered 0, or 1000 mg/kg/day for 4 weeks and then were observed for 2 weeks post treatment to assess the extent of recovery. The "kg" refers to the body weight of the rat. Body weights, clinical signs, mortality, food and water consumption and selected organ weights were monitored throughout the study.

Blood samples were taken for hematology and clinical chemistry investigations from all main study animals during week 4. After 4 weeks of dosing all main study animals were killed and necropsied. For the groups designated for assessment of recovery, blood samples for hematology and clinical chemistry investigations were taken from these animals during week 6. After 6 weeks all the recovery group animals were killed and necropsied. Gross pathology examination was conducted on all animals.

Liver, heart kidneys, spleen, lungs, adrenals, testes and ovaries were examined histopathologically from all Control and High dose animals including the recovery groups. Subsequently, evaluation was extended to liver, spleen, adrenals, and lung from the Low and Intermediate dose animals. In addition, Oil Red O staining for fat was carried out on selected animals.

Dosing Sprague-Dawley rats for 4 weeks with MPIP-T(1) via the diet produced signs of toxicity at 1000 mg/kg/day in both sexes. The most notable effects seen included evidence of liver disfunction (increased liver enzyme levels and bile duct epithelium hypertrophy) and vacuolated macrophages in spleen and lungs. In addition, females receiving 100 mg/kg/day showed slightly reduced cholesterol levels. There was no effect in males receiving 100 mg/kg/day or in either sex receiving 10 mg/kg/day. Some of these effects showed partial resolution after the recovery period.

The results can be summarized as follows:
Mortality: One High dose male met an unscheduled death.
Clinical Sions: Several High dose males had a poor general condition (thin, hunched posture, eyes encrusted and piloerection) during weeks 2–4. In some recovery animals these signs persisted to weeks 5-6. There was no notable clinical signs in females.

- Body Weight: After 4 weeks the High dose group of both sexes showed a marked reduction in body weight gain. These differences were still apparent after the recovery period, but showed some slight resolution.
- Food Consumption: High dose males showed a reduction in food consumption after the 4 weeks of administration and after the 2 weeks recovery period. There were no notable intergroup differences in females.
- Water Consumption: There were no visual intergroup differences in females.
- Achieved Dosages: These were close to nominal.
- Analyses of Formulated Diets: These were within acceptable limits (±10%) of accuracy.

Laboratory Investigations:

Hematology: Mild changes in red blood cell parameters were seen in the High dose group of both sexes after the 4 weeks of treatment and after the recovery period.

Clinical Chemistry: After 4 weeks of treatment the High dose group of both sexes showed increases in AST, ALT, and total bilirubin and reductions in triglycerides and cholesterol. Intermediate dose group females also showed a reduction in cholesterol. High dose males also showed reduced glucose, total protein and creatinine levels and the High dose females showed increased potassium.

After the recovery period the increases in AST and ALT were still apparent in both sexes, as were the reduced triglycerides and creatinine in males and increased potassium in females.

Organ Weights: Males showed no notable intergroup differences after 4 weeks.

In only High dose females, liver, lung and spleen weights were increased at week 4. These increases were still apparent after the recovery period.

Gross Pathology: There were no notable intergroup differences.

Histopathology: A minimal or slight hypertrophy of the bile duct epithelium and infiltration of spleen and lungs by enlarged, foamy or vacuolated macrophages, was seen in High dose males and females. A slight hypertrophy of the zona fasciculata of the adrenals was present in High dose females only. All these findings showed evidence of resolution after the two weeks recovery period.

Subchronic Oral Feeding Studies with Chimassorb 944

During a 13-week rat feeding study with a chemically identical product, lymphoreticular system and liver effects were seen at the higher doses, with a no observable effect level (NOEL) of 6.3–6.9 mg/kg/day.

During a 90-day study, rats were fed diets containing 0, 100, 500, 2000 and 10,000 ppm chimassorb 944 FL. Additional groups of rats also had a 5-week recovery period after treatment where all groups received control diet. The primary target effects were blood disorders (anemia at 10,000 ppm and leucocytosis increase in white blood cells - at 2000 ppm and 10,000 ppm), liver function abnormalities (2000 and 10,000 ppm), and destruction of isolated areas of tissue (chronic necrotizing inflammation) of the mesenteric lymph node (2000 and 10,000 ppm), spleen, liver and ovary (10,000 ppm).

These effects persisted to some degree in the 10,000 ppm group at the end of the 5-week recovery period. The NOEL for all effects, e.g. blood clotting slowing, was 6.7 (males) and 7.0 (females) mg/kg. The NOEL for the primary target effects were 33 mg/kg (males) and 35 mg/kg (females).

During a 6-month study, rats received a dietary administration of 0, 5, 30 and 200 mg/kg/day. The primary target effects were blood disorders (anemia and leucocytosis, 200 mg/kg), liver function abnormalities (200 mg/kg) and inflammation or destruction of isolated areas of tissue (chronic necrotizing inflammation) of the mesenteric lymph nodes (30 and 200 mg/kg) and other organs (ovaries, adrenal cortex and spleen, 200 mg/kg). The NOEL was 5.04 mg/kg and 5.37 mg/kg for males and females, respectively.

A range-finding study for a two-generation reproduction study was performed. Adult rats received dietary levels of 0, 100, 500, 2000 and 10,000 ppm for 2 weeks prior to mating and post-mating. The 10,000 ppm level was found to produce adult toxicity, decreases in body weight gain and food consumption along with gross necropsy changes in the spleen and liver were produced. No effects were observed in mating performance and fertility. In the 2000 and 10,000 ppm groups, pup loss parameters were increased along with decreases in pup weight which apparently caused retarded physical development (delayed pinna unfolding, hair growth, eye opening and incisor eruption).

From the foregoing it is evident that a direct comparison of the MPIP-T(1) and Chimassorb 944 was not made. However, it is clear that the NOEL for each is less than 30 mg/kg/day, and neither stabilizer may be used under conditions where it might be ingested at above the 8 mg/kg/day level. Because excellent thermooxidative stability is obtained with no more than 0.2 phr of the MPIP-T, while more Chimassorb 944 is needed, and further, because the MPIP-T is difficult to extract, it can be concluded that the MPIP-T is safer to use.

Having thus provided a general discussion of the problems addressed and solved in our invention, and a specific illustration of the best mode for preparing a thermooxidatively stabilized polymer, and for thermoforming an article without substantially contaminating the surfaces of the cavity in the mold, and, an article thermoformed from such polymer, it is to be understood that no undue restrictions are to be imposed by reason thereof, except as provided by the following claims.

We claim:

1. A process for stabilizing a substrate of homopolymer of an $\alpha$-olefin or a copolymer of an $\alpha$-olefin in which copolymer a repeating unit derived from said $\alpha$-olefin is present in a major molar amount, against thermooxidative degradation, said process comprising, dispersing within said substrate no more than 0.2 phr of a monomolecular oxo-piperazinyl triazine having three piperazinone substituents, each having a $N^4$-alkylated atom ("MPIP-T"), without any secondary stabilizer, and, stabilizing said substrate against thermooxidative degradation over the useful life of said substrate more effectively than when said substrate is stabilized with an oligomeric piperidinyl-triazine compound having a $N^1$-alkylated atom, and with comparably similar effectiveness when said substrate is stabilized with a hindered phenol, providing each stabilizer is used in the same amount by weight per 100 parts of said substrate.

2. The process of claim 1 wherein said α-olefin is propylene, or a copolymer of propylene in which copolymer a repeating unit derived from propylene is present in a major molar amount, and, said range of MPIP-T is from about 0.1 phr to 0.2 phr.

3. A process for thermoforming a polyolefin article of arbitrary shape, comprising,
dispersing within said polyolefin no more than 0.2 phr of a monomolecular oxo-piperazinyl triazine having three piperazinone substituents, each having a $N^4$-alkylated atom ("MPIP-T"), without any secondary stabilizer,
stabilizing said polyolefin being thermoformed, against thermooxidative degradation at a temperature in the range from about 180° C. to about 250° C.; and, simultaneously, maintaining cavity surfaces of a forming die or mold essentially free from objectionable contaminants during continuous operation of said moled for at least 120 hr to mold a multiplicity of articles.

4. The process of claim 3 wherein said polyolefin is polypropylene, or a copolymer of propylene in which copolymer a repeating unit derived from propylene is present in a major molar amount, and, said range of MPIP-T is from about 0.1 phr to 0.2 phr.

5. A thermooxidatively stabilized thermoformed article of arbitrary shape, formed from a homopolymer of an α-olefin, or a copolymer of an α-olefin in which copolymer a repeating unit derived from said α-olefin is present in a major molar amount, in combination with no more than 0.2 phr of a monomolecular oxo-piperazinyl triazine having three piperazinone substituents, each having a $N^4$-alkylated atom ("MPIP-T"), without any secondary stabilizer, said MPIP-T having the structure

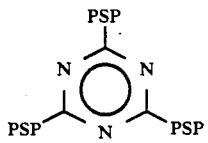

wherein PSP represents a substituent derived from a cyclic amine represented by a structure selected from the group consisting of

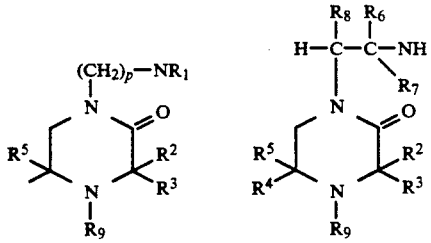

wherein
$R_1$ represents $C_1$-$C_{24}$ alkyl, $C_5$-$C_{20}$ cycloalkyl $C_7$-$C_{20}$ araalkyl or alkaryl, $C_1$-$C_{24}$ aminoalkyl, or $C_6$-$C_{20}$ aminocycloalkyl;
$R_2$, $R_3$, $R_4$, and $R_5$ independently represent $C_1$-$C_{24}$ alkyl; and $R_2$ with $R_3$, or $R_4$ with $R_5$ are cyclizable to $C_5$-$C_{12}$ cycloalkyl including the $C^3$ and $C^5$ atoms respectively, of the piperazin-2-one ring;
$R_6$ and $R_7$ independently represent $C_1$-$C_{24}$ alkyl, and polymethylene having from 4 to 7 carbon atoms which are cyclizable;
$R_8$ represents H, $C_1$-$C_6$ alkyl, and phenyl;
$R_9$ represents $C_1$-$C_3$ alkyl; and,
p represents an integer in the range from 2 to about 10.

6. The thermooxidatively article of claim 5, wherein said polyolefin is polypropylene, or a copolymer of propylene in which copolymer a repeating unit derived from propylene is present in a major molar amount, and, said range of MPIP-T is from about 0.1 phr to 0.2 phr.

7. The thermooxidatively article of claim 6 wherein $R_2$, $R_3$, $R_4$, and $R_5$ independently represent $C_1$-$C_6$ alkyl; $R_2$ with $R_3$ is pentamethylene, and $R_4$ with $R_5$ is pentamethylene.

8. The thermooxidatively article of claim 6 wherein $R_2$, $R_3$, $R_4$, and $R_5$ are each methyl, represent $C_1$-$C_6$ alkyl; $R_2$ with $R_3$ is pentamethylene, and $R_4$ with $R_5$ is pentamethylene; $R_1$ is selected from $C_1$-$C_{18}$ alkyl, and $C_6$-$C_{20}$ cycloalkyl.

9. A method for imparting improved strength and discoloration resistance of a stabilized polypropylene article exposed to heat in an oxygen-containing atmosphere, which comprises, incorporating into said polypropylene polymer which is essentially free of a hindered phenol antioxidant or a phosphorous acid ester, an effective amount, no more than 0.2 phr, of a monomolecular oxo-piperazinyl triazine having three piperazinone substituents, each having a $N^4$-alkylated atom ("MPIP-T"), without any secondary stabilizer, said MPIP-T having the structure

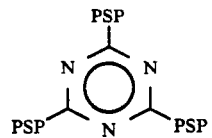

wherein PSP represents a substituent derived from a cyclic amine represented by a structure selected from the group consisting of

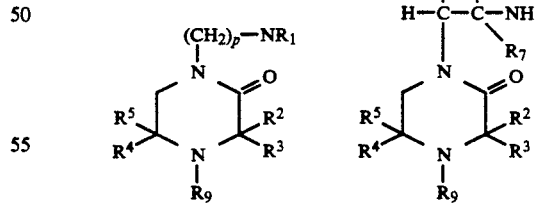

wherein,
represents $C_1$-$C_{24}$ alkyl, $C_5$-$C_{12}$ cycloalkyl, $C_7$-$C_{20}$ araalkyl or alkaryl, $C_1$-$C_{24}$ aminoalkyl, or $C_6$-$C_{20}$ aminocycloalkyl;
$R_2$, $R_3$, $R_4$, and $R_5$ independently represent $C_1$-$C_{24}$ alkyl; and
$R_2$ with $R_3$, or $R_4$ with $R_5$ are cyclizable to $C_5$-$C_{12}$ cycloalkyl including the $C^3$ and $C^5$ atoms respectively, of the piperazin-2-one ring;

$R_6$ and $R_7$ independently represent $C_1$–$C_{24}$ alkyl, and polymethylene having from 4 to 7 carbon atoms which are cyclizable;

$R_8$ represents H, $C_1$–$C_6$ alkyl, and phenyl;

$R_9$ represents $C_1$–$C_3$ alkyl; and, p represents an integer in the range from 2 to about 10.

10. The method of claim 9 wherein said effective amount of said PIP-T is in the range from about 0.1 phr to 0.2 phr.

* * * * *